United States Patent
Vogel

(10) Patent No.: US 9,527,148 B2
(45) Date of Patent: Dec. 27, 2016

(54) METHOD FOR SKIVING AND ACCORDING APPARATUS COMPRISING A SKIVING TOOL

(75) Inventor: Olaf Vogel, Ettlingen (DE)

(73) Assignee: KLINGELNBERG AG (SE)

( * ) Notice: Subject to any disclaimer, the term of this patent is extended or adjusted under 35 U.S.C. 154(b) by 438 days.

(21) Appl. No.: 14/116,082

(22) PCT Filed: May 3, 2012

(86) PCT No.: PCT/EP2012/058149
§ 371 (c)(1),
(2), (4) Date: Nov. 6, 2013

(87) PCT Pub. No.: WO2012/152659
PCT Pub. Date: Nov. 15, 2012

(65) Prior Publication Data
US 2014/0079498 A1    Mar. 20, 2014

(30) Foreign Application Priority Data

May 6, 2011   (DE) .................... 20 2011 050 054 U
May 26, 2011  (EP) ..................... 11167702

(51) Int. Cl.
*B23F 5/16* (2006.01)
*B23F 21/10* (2006.01)
(Continued)

(52) U.S. Cl.
CPC ............ *B23F 5/163* (2013.01); *B23F 21/06* (2013.01); *B23F 21/106* (2013.01);
(Continued)

(58) Field of Classification Search
CPC .. B23F 5/16; B23F 5/163; Y10T 409/105724; Y10T 409/103975; Y10T 409/104293; Y10T 409/105247; Y10T 409/105565
See application file for complete search history.

(56) References Cited

U.S. PATENT DOCUMENTS 2,598,327 A * 5/1952 Wildhaber ............... B23F 5/16
                                                    409/36
3,264,940 A * 8/1966 Wildhaber ............. B23F 5/202
                                                    407/28
(Continued)

FOREIGN PATENT DOCUMENTS

DE           243514       2/1912
DE        10 46 445 B    12/1958
(Continued)

OTHER PUBLICATIONS

EPO machine translation of DE 4122460, printed Feb. 2016.*
(Continued)

*Primary Examiner* — Daniel Howell
(74) *Attorney, Agent, or Firm* — McCarter & English, LLP

(57) ABSTRACT

A method and an apparatus for skiving a work piece that has a rotationally-symmetric, periodic structure, by applying a skiving tool. The skiving tool has a tapering collision structure. During skiving, a coupled relative movement of the skiving tool in relation to the work piece is performed. The skiving tool is rotated about a first rotation axis and the work piece is rotated about a second rotation axis. A negative tilt angle is set during skiving, and the first rotation axis runs skew with respect to the second rotation axis.

19 Claims, 14 Drawing Sheets

(51) Int. Cl.
*B23F 21/12* (2006.01)
*B23F 21/06* (2006.01)

(52) U.S. Cl.
CPC ....... *B23F 21/128* (2013.01); *Y10T 82/16114* (2015.01); *Y10T 407/17* (2015.01); *Y10T 409/100159* (2015.01); *Y10T 409/101749* (2015.01); *Y10T 409/105088* (2015.01); *Y10T 409/105724* (2015.01)

(56) References Cited

U.S. PATENT DOCUMENTS

| | | | | |
|---|---|---|---|---|
| 3,399,599 | A | * | 9/1968 | Looman ............ B23F 5/163 409/34 |
| 3,570,367 | A | * | 3/1971 | Looman ............ B23F 5/163 409/34 |
| 4,066,001 | A | * | 1/1978 | Nishijima ........... B23F 5/163 407/28 |
| 8,939,687 | B2 | * | 1/2015 | Heinemann ......... B23F 5/163 409/28 |
| 2012/0148360 | A1 | * | 6/2012 | Heinemann ......... B23F 5/163 409/12 |

FOREIGN PATENT DOCUMENTS

| | | |
|---|---|---|
| DE | 41 22 460 C1 | 4/1992 |
| DE | 10 2009 003601 A1 | 9/2010 |

OTHER PUBLICATIONS

English translation of the International Search Report for International Application No. PCT/EP2012/058149, dated Jun. 28, 2012.
English translation of the Written Opinion of the International Searching Authority for International Application No. PCT/EP2012/058149, dated Nov. 6, 2013.

\* cited by examiner

METHOD FOR SKIVING AND ACCORDING APPARATUS COMPRISING A SKIVING TOOL

CROSS-REFERENCE TO RELATED APPLICATIONS

This application is the U.S. National Phase of International Application No. PCT/EP2012/058149, entitled "Method of Hob Peeling and Corresponding Device Having a Hob Peeling Tool", filed on May 3, 2012, which claims priority from German Patent Application No. 20 2011 050 054.3, filed May 6, 2011, and from European Patent Application No. EP 11 167 702.7, filed May 26, 2011, the disclosures of which are hereby incorporated by reference in their entirety.

FIELD OF THE INVENTION

The invention relates to a method for skiving a toothing or another periodic structure and an apparatus for skiving a toothing or another periodic structure comprising a skiving tool.

BACKGROUND OF THE INVENTION

There are numerous methods for manufacturing gear wheels. In the chip-removing soft pre-machining, one distinguishes hobbing, gear shaping, generating planing and (power) skiving. The hobbing and skiving are so-called continuous methods, as shall be explained in the following.

In the chip-removing manufacturing of gear wheels, one distinguishes between the intermitted indexing process or single indexing process and the continuous method, which is partly also called a continuous indexing process or face hobbing.

In the continuous method, for example, a tool comprising cutters is applied in order to cut the flanks of a work piece. The work piece is cut in one clamping continuously, i.e., in an uninterrupted process. The continuous method is based on complex coupled movement sequences, in which the tool and the work piece to be machined perform a continuous indexing movement relative to each other. The indexing movement results from the driving in coordination with respect to the couplely driving of plural axle drives of a machine.

In the single indexing process, one tooth gap is machined; then, for example, a relative movement of the tool and a so-called indexing movement (indexing rotation), in which the work piece rotates relative to the tool, are carried out, and then the next tooth gap is machined. In this way, a gear wheel is manufactured step by step.

The initially mentioned gear shaping method may be described or represented by a cylinder gear transmission, because the intersection angle (also called intersection angle of axes) between the rotation axis R1 of the shaping tool 1 and the rotation axis R2 of the work piece 2 amounts to zero degrees, as represented schematically in FIG. 1. The two rotation axes R1 and R2 run parallel, if the intersection angle of axes amounts to zero degrees. The work piece 2 and the shaping tool 1 rotate continuously about their rotation axes R2 respectively R1. In addition to the rotational movement, the shaping tool 1 carries out a stroke movement, which is referenced in FIG. 1 by the double arrow $s_{hx}$, and removes chips from the work piece 2 during this stroke movement.

Some time ago a method has been taken up anew, which is called (power) skiving. The basics are aged approximately 100 years. A first patent application with the number DE 243514 on this subject dates back to the year 1912. After the original considerations and investigations of the initial years, skiving was no longer pursued further seriously. Hitherto, complex processes, which were partly empirical, were necessary in order to find a suitable tool geometry for the skiving method.

About in the middle of the nineteen eighties, skiving was taken up anew. It was not until the present-day simulation methods and the modern CNC-controls of the machines, that the principle of skiving could be implemented as a productive, reproducible and robust method. The high durability of present-day tool materials, the enormous high static and dynamical rigidity and the high performance of the synchronous running of the modem machines come in addition.

As shown in FIG. 2, during skiving, an intersection angle of axes Σ between the rotation axis R1 of the skiving tool 10 (also called skiving wheel) and the rotation axis R2 of the work piece 20 is prescribed, which is different from zero. The resulting relative movement between the skiving tool 10 and the work piece 20 is a helical movement, which can be decomposed into a rotational portion (rotatory portion) and an advance portion (translational portion). A generation helical type gear transmission can be considered as a drive technology-specific analogon, wherein the rotational portion corresponds to the rolling and the advance portion corresponds to the gliding of the flanks. The greater the absolute value of the intersection angle of axes Σ, the more the translational movement portion required for the machining of the work piece 20 increases. It causes namely a movement component of the cutting edges of the skiving tool 10 in the direction of the tooth flanks of the work piece 20. Thus, during skiving, the gliding portion of the combing relative movement of the mutually engaging gear wheels of the equivalent helical gear is utilized to carry out the cutting movement. In skiving, only a slow axial feed (also called axial feed) is required and the so-called shaping (pushing) movement, which is typical for the gear shaping, is dispensed with. Thus, also a return stroke movement does not occur in skiving.

The cutting speed in skiving is influenced directly by the rotational speed of the skiving tool 10 with respect to the work piece 20 and the utilized intersection angle of axes Σ between the rotation axes R1 and R2. The intersection angle of axes Σ and thus the gliding portion should be selected such that for a given rotational speed an optimum cutting speed is achieved for the machining of the material.

The movement sequences and further details of an established skiving method can be taken from the schematic representation in FIG. 2 that has already been mentioned. FIG. 2 shows the skiving of an outer toothing on a cylindrical work piece 20. The work piece 20 and the tool 10 (here a cylindrical skiving tool 10) rotate in opposite directions.

There are additional relative movements. An axial feed $s_{ax}$ is required in order to be able to machine with the tool 10 the entire toothing width of the work piece 20. If a helical toothing is desired on the work piece 20 (i.e., $\beta_2 \neq 0$), a differential feed $s_D$ is superimposed on the axial feed $s_{ax}$. A radial feed $s_{rad}$ may be carried out as a lining movement. The radial feed $s_{rad}$ may also be employed in order to influence the convexity of the toothing of the work piece 20.

In skiving, the vector of the cutting speed $\vec{v}_c$ results substantially as the difference of the two velocity vectors $\vec{v}_1$ and $\vec{v}_2$ of the rotation axes R1, R2 of the tool 10 and the work piece 20, which [velocity vectors] are tilted with respect to each other by the intersection angle of axes $\Sigma$. The symbol $\vec{v}_1$ is the velocity vector at the periphery of the tool and $\vec{v}_2$ is the velocity vector at the periphery of the work piece 20. The cutting speed $v_c$ of the skiving process may thus be changed by the intersection angle of axes $\Sigma$ and the rotation speed in the equivalent helical gear. The axial feed $s_{ax}$ has only a small influence on the cutting speed $v_c$ which can be neglected and is thus not shown in the vector diagram comprising the vectors $\vec{v}_1$, $\vec{v}_2$ and $\vec{v}_c$ in FIG. 2.

The skiving of an outer toothing of a work piece 20 using a conical skiving tool 10 is shown in FIG. 3. In FIG. 3 again, the intersection angle of axes $\Sigma$, the vector of the cutting speed $\vec{v}_c$, the velocity vectors $\vec{v}_1$, at the periphery of the tool 10 and $\vec{v}_2$ at the periphery of the work piece 20 as well as the cant angle $\beta_1$ of the tool 10 and the cant angle $\beta_2$ of the work piece 20 is shown. Here, in contrast to FIG. 2, the cant angle $\beta_2$ is different from zero. The tooth head of the tool 10 is referenced with the reference sign 4 in FIG. 3. The tooth breast is referenced with the reference sign 5 in FIG. 3. The two rotation axes R1 and R2 do not intersect, but are arranged skew (skew-whiff) with respect to each other. For a conical skiving tool 10, the calculation point AP is hitherto usually chosen on the joint plumb of the two rotation axes R1 and R2, because a tilting of the skiving tool 10 for providing of end relieve angles is not necessary. The calculation point AP coincides with the so-called contact point. The rolling circles of the equivalent helical generation gear contact each other in this calculation point AP.

In order to make the productivity of the skiving—for example when applying modern cutting materials such as hard metals for dry machining—as large as possible, the gliding portion of the relative movement between the skiving tool and the work piece must produce sufficiently high cutting speeds. In skiving, the cutting speed $v_c$ is influenced directly by the rotation speed of the equivalent helical gear, by the effective work piece with respect to tool radii and by the intersection angle of axes $\Sigma$ of the rotation axes R1 and R2. The possible rotation speed is limited here by the permitted rotational frequency of the machining apparatus (skiving machine) used. The size of the work piece is fixedly predetermined. The possible size of the tool is limited by the work space of the machining apparatus (skiving machine) employed and for inner toothings also by the inner space of this proper toothing. Therefore, sufficiently high cutting speeds can often be generated only by corresponding large intersection angles of axes $\Sigma$.

The intersection angle of axes $\Sigma$, however, cannot be predetermined arbitrarily in practice, because beside the purely vectorial consideration of the different movements, which are superimposed, there are a number of other aspects, which must be taken into account compulsorily. These additional aspects, which must be incorporated in the considerations, are described in the following paragraphs.

In skiving, a tool 10 comes to application, which comprises at least one geometrically determined cutting edge. The cutting edge/cutting edges are not shown in FIG. 2 and FIG. 3. The shape and arrangement of the cutting edges belong to those aspects, which must be taken into account for a concrete layout in practice.

In addition, the tool itself has a great importance in skiving. In the example shown in FIG. 2, the skiving tool 10 has the shape of a spur-toothed spur wheel. The outer contour of the base body in FIG. 2 is cylindrical. However, it can also be tapered (also called conical), as shown in FIG. 3. Because the tooth or the teeth of the skiving tool 10 come in engagement along the entire length of the cutting edge, each tooth of the tool 10 requires a sufficient end relieve angle at the cutting edge.

When starting from a spur-toothed or a helically toothed conical skiving tool 10 as shown in the FIGS. 4A and 4B, then one recognizes that such a skiving tool 10 has so-called constructive end relief angles (respectively rake angles) due to the conical basic shape of the skiving tool 10, i.e., the end relieve angle at the head and on the flanks of the conical skiving tool 10 are predetermined due to the geometry of the skiving tool 10. However, the profile of the cutting edge of a conical skiving tool 10, must obey certain conditions, in order to enable reshaping at all. In the FIGS. 4A and 4B, a conical skiving tool 10 is shown when generating an outer toothing on a work piece 20. The so-called constructional rake angle $\alpha_{Ko}$ at the cutter head of the conical skiving tool 10 is visible in FIG. 4B. The intersection point of axes AK and the contact point BP of the rolling circles of the skiving tool 10 and the work piece 20 coincide in FIG. 4A and lie on the joint plumb GL (not shown in FIGS. 4A and 4B) of the rotation axes R1 and R2.

In FIG. 5, a further representation of a spur-toothed or helical-toothed conical skiving tool 10 and a cylinder-shaped work piece 20 is shown, wherein the view of FIG. 5 has been chosen such that both rotation axes R1 and R2 run parallel, although the two axes R1 and R2 are skew with respect to each other. The joint plumb GL of the two axes R1 and R2 can be seen in FIG. 5. The contact point BP lies on the joint plumb GL as shown in FIG. 5.

In FIGS. 6A and 6B, a configuration of a cylindrical skiving tool 10 and an outer-toothed cylindrical work piece 20 is shown. The skiving tool 10 is not only skewed with respect to the rotation axis R2 of the work piece 20 (as can be recognized in FIG. 6A on the basis of the intersection angle of axes $\Sigma$), but is positioned with respect to the work piece 20 such that it is tilted away from it by a small angle $\alpha_{Ki}$ (as is seen in FIG. 6B). By tilting the skiving tool 10 away, an effective rake angle can thus be generated, which is shown in FIG. 6B for the head cutting edge as $\alpha_{Ki}$. Effective rake angles are also generated at the lateral cutting edges of the tool by the tilting away. However, these turn out to be smaller than at the head cutting edge. As a general rule, these rake angles are only half as large.

When starting from a spur-toothed or a helically toothed cylindrical skiving tool 10, as shown in the FIGS. 6A and 6B, one recognizes that such a skiving tool 10 does not have so-called constructional rake angles, neither at the head nor at the flanks. If such a cylindrical skiving tool 10 was clamped in the conventional manner, there would be no rake angles. A kinematic rake angle can be generated by the tilting away of the skiving tool 10 as already described. In practice, the tilting away of the skiving tool 10 is achieved by an eccentric clamping of the skiving tool 10 in the machine, in order to thus cause an offset of the cutting face from the intersection point of axes AK. The contact point BP of the rolling circles of the skiving tool 10 and the work piece 20 no longer lies on the joint plumb of the rotation axes R1 and R2 due to the tilting away of the skiving tool 10. The resulting offset is also called cutting face offset e and is recognizable in FIG. 6A. The further the skiving tool 10 is tilted away, the larger the effective rake angles become. The rake angles required for skiving lie in the range between 3 degrees and 5 degrees. In order to prescribe these rake angles, a tilting away of cylindrical skiving tools 10 of up to 10 degrees is required and usual in practice.

In the FIGS. 7A and 7B, further illustrations of a spur-toothed and a helically toothed skiving tool 10 and a cylindrical work piece 20 are shown, whereby the view of FIG. 7A has been chosen such that both rotation axes R1 and R2 run parallel to each other, although the two axes R1 and R2 are skew with respect to each other. In FIG. 7A, the joint plumb GL of the two axes R1 and R2 can be recognized. In the FIGS. 7A and 7B, the contact point BP is located above the joint plumb GL. In FIG. 7B, a so-called contact view (also called side projection of contact plane) is shown, in which the contact point BP is visible. In the representation of FIG. 7A, the contact point BP lies hidden behind the work piece 20.

Beside the kinematic aspects and the conditions, which result from the prescription of the desired clearance angles, also the properties and condition of the work piece 20 plays a role that is not unimportant. Again and again, there are work pieces, in which a section having a greater diameter than the diameter of the root circle joins the toothing or the periodical structure and which therefore allow only a small overrun in the manufacture of a toothing or another periodical structure.

In the FIGS. 8A and 8B, an example of a work piece 20 is shown, which comprises a first cylindrical section 21 and a second cylindrical section 22, wherein an outer toothing is to be manufactured on the first cylindrical section 21 by means of skiving by application of a conical skiving tool 10. The work piece 20 may, for example, concern a shaft comprising sections having different diameters. An effective intersection angle of axes $\Sigma_{eff}$ of at least 10 degrees is required for achieving a sufficient cutting speed $v_c$. It can be recognized both in FIG. 8A and also in FIG. 8B, that the conical skiving tool 10 with an effective intersection angle of axes $\Sigma_{eff}$ of at least 10 degrees would collide with the second cylindrical section 22 of the work piece 20 for a common clamping. The collision section is schematically indicated by an oval KB in FIG. 8B. For a cylindrical skiving tool 10, as shown, e.g., in FIG. 7A, a collision would also result, whereby the situation there is even worse due to the additional tilt.

SUMMARY OF THE INVENTION

It is an object of the present invention to provide a method and an apparatus for the chip-removing machining of the tooth flanks of a gear wheel or other periodic structures, which is in particular suitable for machining work pieces that allow only a small overrun.

In addition, the method and the apparatus shall be robust and suitable for an application in the series production, for example in the automotive industry.

This object is solved according to the present invention by a method which is herein called a modified skiving method. The modified skiving method concerns a continuous cutting method that is suitable for the manufacturing of rotation-symmetric periodical structures. As the name skiving (resp. hob peeling) indicates, a hobbing method is concerned. To be precise, a continuous hobbing toothing method is concerned. Herein, skiving refers to the description and design of the generating train with the kinematics of a helical gear.

The method relates to skiving of a work piece having a rotation-symmetric periodical structure by an application of a skiving tool. In this skiving method:
- the skiving tool rotates continuously about a first rotation axis,
- the work piece rotates continuously and synchronously to the skiving tool about a second rotation axis, and
- the rotating skiving tool performs a relative movement with respect to the rotating work piece, wherein
- during the skiving a negative tilt angle of the skiving tool is set, which angle is greater than 15 degrees and
- the first rotation axis runs skew (skew-whiff) with respect to the second rotation axis.

By the coupled movement of the skiving tool and the work piece, a relative movement results between the skiving tool and the work piece, which corresponds to the relative movement of a helical gear or is approximated to a helical gear.

During the machining phase, the skiving tool is inclined in the direction towards the work piece, i.e., inclined in the opposite direction as compared to the prior art's inclination away from the work piece for yielding kinematic clearance angles.

Preferably, in all embodiments, the skiving tool is inclined towards the toothing or the periodic structure on the work piece.

The tilt angle is preferably in the angular range between −2 degrees and −45 degrees and preferably between −5 degrees and −30 degrees.

An effective intersection angle of axes results, which is the smaller one in terms of the absolute value of the angle that is embraced by the two rotation axes.

Preferably, the invention is applied where the work piece allows only a small overrun, as, for example, a component having a circumferential collar.

In the modified skiving method of the invention, the relative movement sequences (called relative movement) between the work piece and the skiving tool are performed predetermined and coordinated in a way such that collisions do not occur.

The modified skiving method concerns a continuous cutting method. As the name skiving (hob peeling) indicates, a hobbing method is concerned. To be precise, a continuous hobbing toothing method is concerned.

Preferably, in all embodiments, a skiving tool like a skiving wheel is employed, which differs significantly from front cutter head tools.

According to the invention, the skiving tool has a tool section like a skiving wheel and has cutting edges that are formed in the shape of cutting teeth which protrude outwards obliquely.

According to the invention, the skiving tool has a tool section having the shape of a generating cutter, preferably the shape of a disc-type generating cutter or a deep counterbore-type generating cutter (e.g., according to DIN 3972 or DIN 5480).

The skiving-wheel-type skiving tools according to the invention are designed either as so-called massive tools, i.e., tools that are implemented essentially integrally, or as cutter head tools (hereinafter called bar cutter skiving wheel) that have a cutter head base body equipped with cutter inserts, preferably in the shape of bar cutters.

According to the invention, preferably in all embodiments, the skiving tools have so-called constructional rake angles, i.e., the rake angles are predetermined due to the geometry of the skiving tool by taking into account the kinematics.

The invention is employed preferably for component parts, which have a so-called fitting interference contour (e.g., a collision flank) and which thus can not be manufactured with a conventional skiving method in most cases.

The invention is based on the feature that the absolute value of the tilt angle δ is set to be greater or equal to 15 degrees, i.e., the skiving tool is tilted significantly more than conventional skiving methods.

Using the modified skiving method as described and claimed, the most different toothings and other periodically reoccurring structures can be manufactured.

For cylindrical toothings of the work piece, a cutting face offset e is prescribed, which is negative for inner toothings and positive for outer toothings.

In the modified skiving, material is removed progressively until the teeth or the other periodical structures are formed completely. The particular approach of skiving is the manufacturing in plural cuts or machining phases. Here for example, a tooth gap is cut firstly to a determined depth and subsequently to the full depth.

The method according to invention can be performed both as a dry or wet machining.

The modified skiving cannot be employed for the machining of outer toothings only. The modified skiving can be employed advantageously for the manufacturing of inner toothings.

The modified skiving can be employed both in the pre-toothing before the heat treatment of the work piece and also in the finishing toothing after the heat treatment, i.e., the skiving is suitable for the soft-machining and for the hard (fine) machining.

BRIEF DESCRIPTION OF THE DRAWINGS

Further details and advantages of the invention are described in the following on the basis of embodiment examples and with reference to the drawings. In all schematic drawings (i.e., also in the collision representations of the FIGS. 8A and 8B), for reasons of simplicity of the representation, the work piece and the skiving tool are reduced to the situation on the rolling circle (respectively on the work piece to the rolling cylinder). However, the represented conditions hold, for the entire toothing having a tooth height.

DETAILED DESCRIPTION OF EMBODIMENTS OF THE INVENTION

Figure 1:
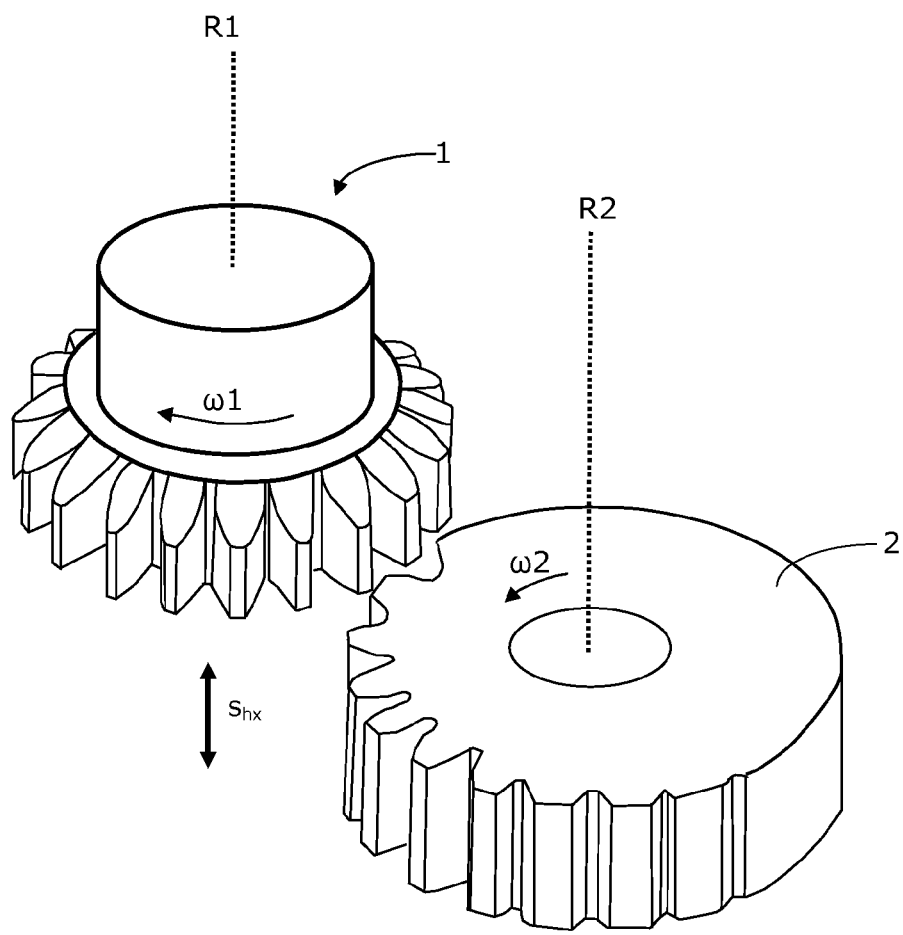
FIG. 1 shows a schematic representation of a pushing wheel having a cylindrical outer contour in engagement with a work piece having an outer toothing during gear shaping.
Figure 2:
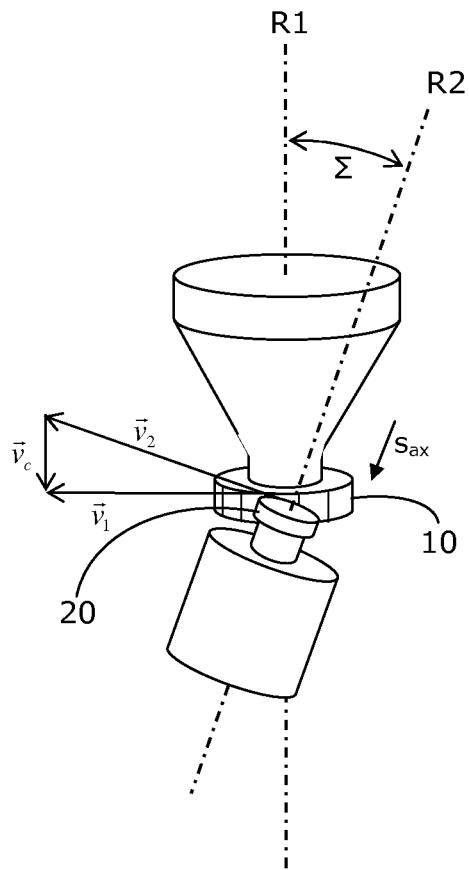
FIG. 2 shows a schematic representation of a spur-toothed skiving wheel having a cylindrical outer contour in engagement with a work piece having an outer toothing during skiving.
Figure 3:
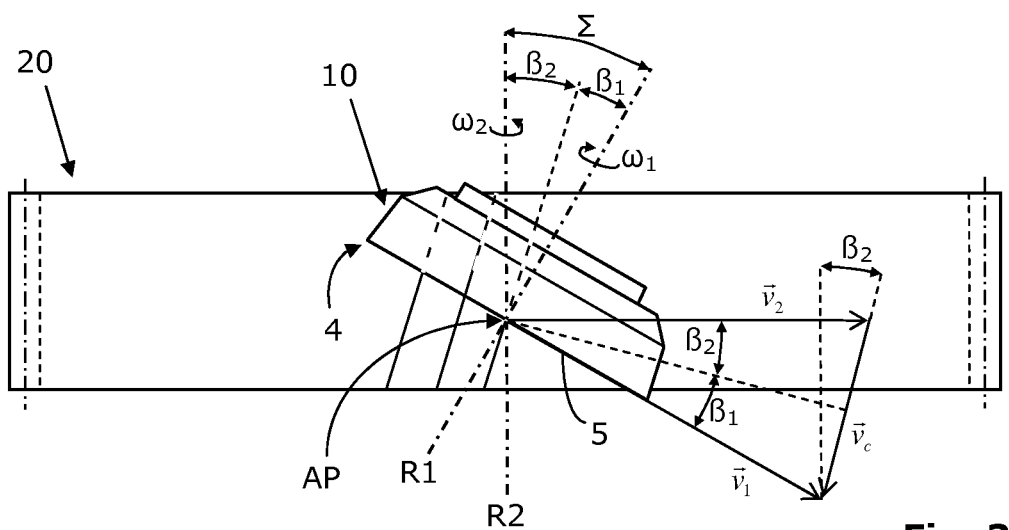
FIG. 3 shows a schematic representation of a helically toothed skiving wheel having a conical outer contour in engagement with a work piece having an outer toothing during skiving.
Figure 4A:
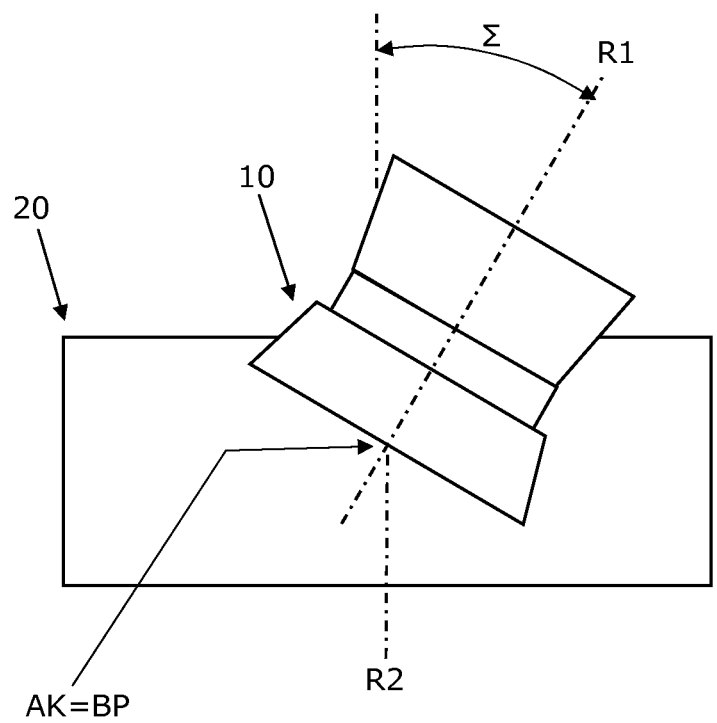
FIG. 4A shows a schematic projection of intersection of axes (projection of contact plane) of a conical skiving tool during skiving of a work piece having an outer toothing, wherein an intersection angle of axes is predetermined in the conventional manner.
Figure 4B:
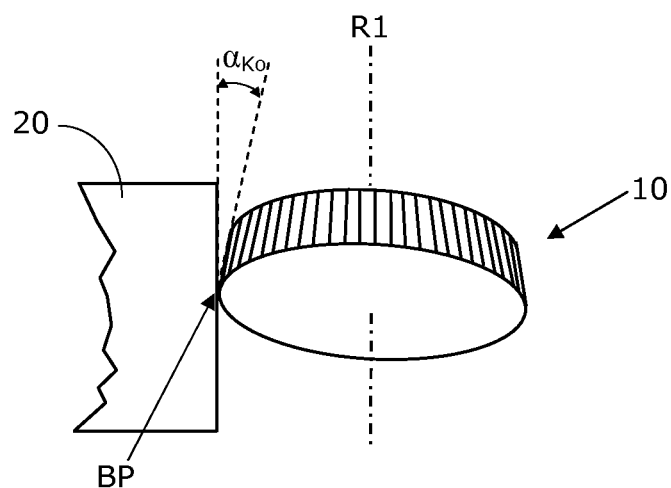
FIG. 4B shows a schematic side projection of intersection of axes (side projection of contact plane) of the conical skiving tool and the work piece of FIG. 4A.
Figure 5:
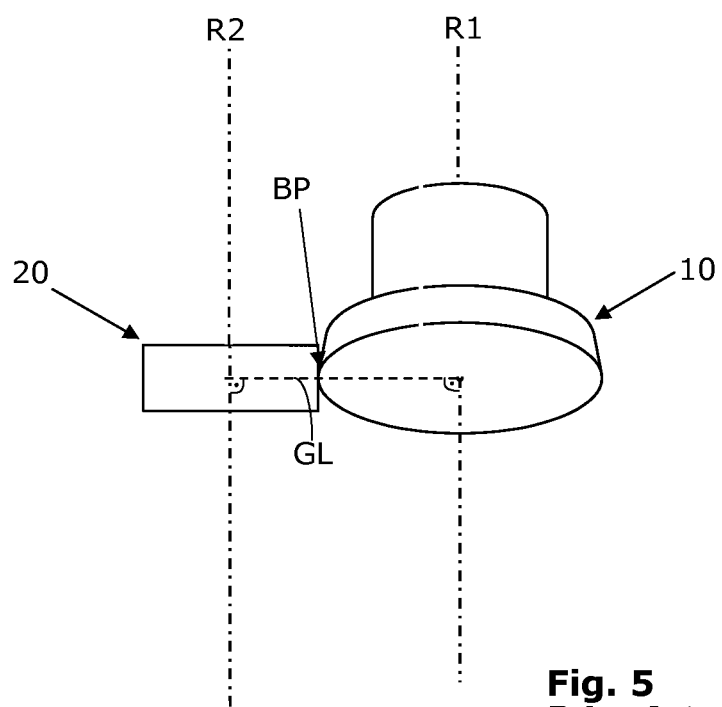
FIG. 5 shows a schematic view of a further conical skiving tool during skiving of a work piece having an outer toothing, wherein the skiving tool is untilted with respect to the work piece in the conventional manner.
Figure 6A:
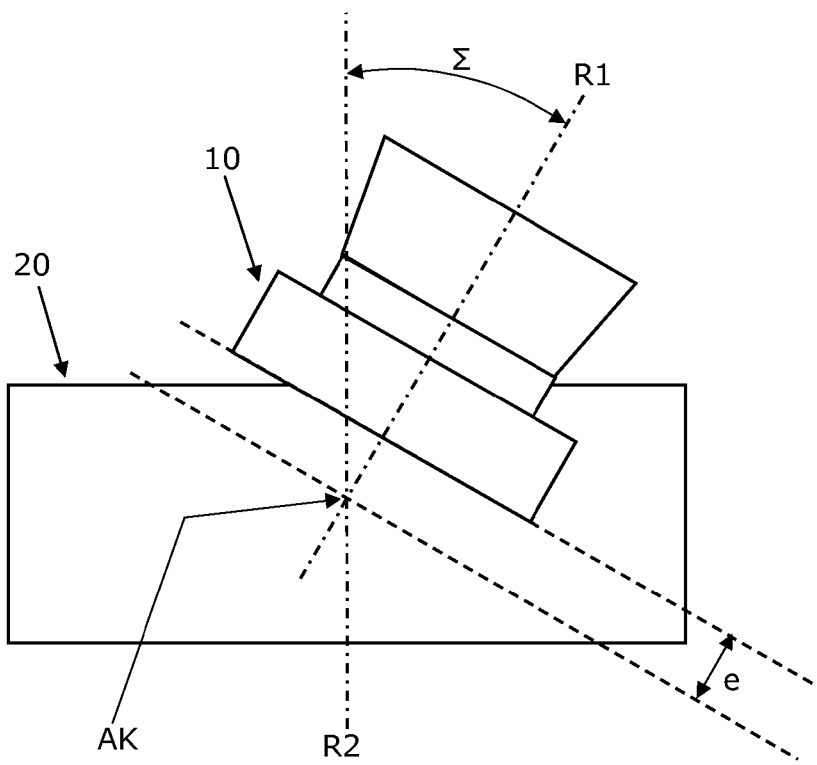
FIG. 6A shows a schematic projection of intersection of axes of a cylindrical skiving tool during skiving of a work piece having an outer toothing, wherein the skiving tool is tilted away from the work piece with a small angle in the conventional manner and there results a cutting face offset.
Figure 6B:
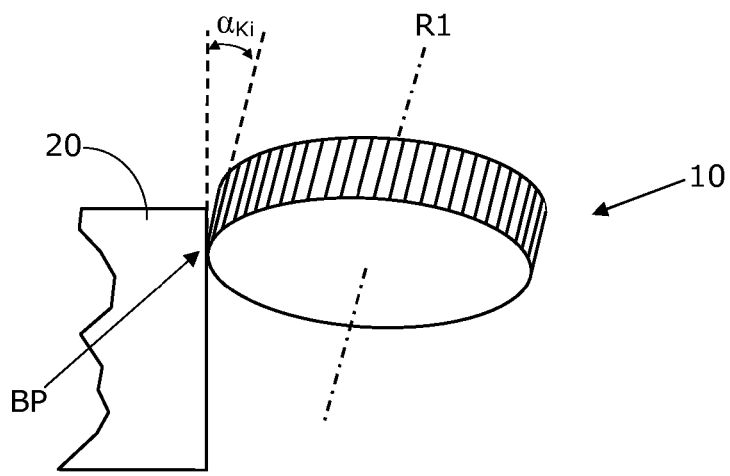
FIG. 6B shows a schematic side projection of contact plane of the cylindrical skiving tool and the work piece of FIG. 6A.
Figure 7A:
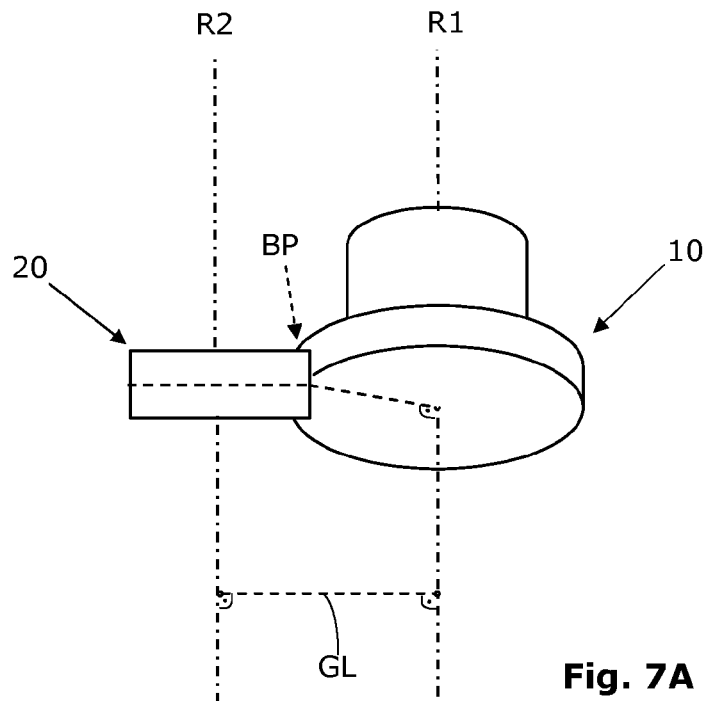
FIG. 7A shows a schematic side projection of intersecting axes of a further cylindrical skiving tool during the skiving of an outer toothed work piece, wherein the skiving tool is inclined away from the work piece by a small angle in the conventional manner.
Figure 7B:
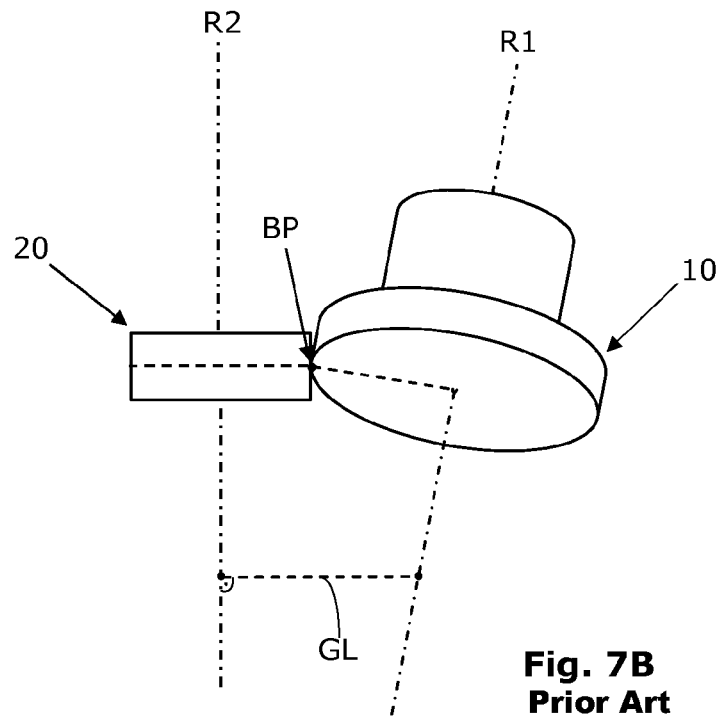
FIG. 7B shows a schematic side projection of contact plane of the cylindrical skiving tool and work piece of FIG. 7A.

In relation with the present description, terms are used which also find use in relevant publications and patents. It is noted however, that the use of these terms shall merely serve a better comprehension. The inventive idea and the scope of the patent claims shall not be limited in their interpretation by the specific selection of the terms. The invention can be transferred without further ado to other systems of terminology and/or technical areas. In other technical areas, the terms are to be employed analogously.

Rotational-symmetric periodic structures are, for example, gear wheels having an inner and/or outer toothing. However, for example, brake discs, clutch or gear transmission elements, and so on may also be concerned. The skiving tools are particularly suitable for the manufacturing of pinion shafts, worms, ring gears, toothed wheel pumps, ring joint hubs (ring joints are employed, for example, in the motor vehicle sector for transmitting the force from a differential gear to a vehicle wheel), spline shaft joints, sliding collars, belt pulleys, and so on. Herein, the periodic structures are also called periodically repeating structures.

In the following, mention is made primarily of gear wheels, teeth and tooth gaps. However, as mentioned above, the invention can also be transferred to other construction parts with other periodic structures. In this case, these other construction parts do not concern tooth gaps, but, for example, grooves or channels.

basic parameters of the skiving tool 100, such as, for example, the diameter and the tilt angle (basic tool geometry).

The geometrical and kinematic engagement conditions at the calculation point AP are designed as optimal as possible. The engagement conditions change with increasing distance from the calculation point AP. In this relation, skiving represents a very complex process, in which the engagement conditions vary also during the movement of the cutting edge. However, the varying engagement conditions can be influenced selectively via the engagement conditions at the calculation point AP.

Thus, the correct design of the engagement conditions at the calculation point AP have a considerable importance in the design of skiving processes.

Terms concerning the arrangement of axes:

There are several terms, which are required for the definition of the arrangement of axes. These terms are described in Table 1 below.

TABLE 1

| | |
|---|---|
| joint plumb, orthogonal projection of joint plumb, joint plumb vector | Skiving processes are characterized by rotation axes R2 and R1 of the work piece 50, 60, 70 and the skiving tool 100, which intersect each other in space. For the two rotation axes R2 and R1 intersecting each other, the joint plumb GL can be indicated uniquely. The orthogonal projection (base point) of the joint plumb on the rotation axis R2 of the work piece 50, 60, 70 shall be GLF2. The orthogonal projection of the joint plumb on the rotation axis R1 of the skiving tool 100 shall be GLF1. The joint plumb vector GLV shall be the connection vector from GLF1 to GLF2. |
| projection of intersection of axes, intersection point of axes | The view of the work piece 50, 60, 70 and the skiving tool 100 along the joint plumb GL in the direction of the joint plumb vector GLV is called projection of intersection of axes. In the projection of intersection of axes, the projected rotation axes R1 and R2 intersect each other in the intersection point of axes R1, which corresponds to the joint plumb L that is reduced in the projection to a point. |
| intersection angle of axes | The intersection angle of axes $\Sigma$ is the angle, the absolute value of which is smaller, and which is embraced by the two rotation axes R1 and R2. It becomes visible in the projection of intersection of axes. The following holds: $-90° < \Sigma < 90°, \Sigma \neq 0°$. The intersection angle of axes $\Sigma$ carries a sign. The sign is defined in the projection of intersection of axes as follows without limiting the generality: For outer toothings, the intersection angle of axes $\Sigma$ is positive, if the projected rotation axis R1 is rotated about the intersection point of axes AK mathematically positive by $|\Sigma|$ with respect to the projected rotation axis. For inner toothings, it is positive, if the projected rotation axis R1 is rotated about the intersection point of axes AK mathematically negative by $|\Sigma|$ with respect to the projected rotation axis R2. |
| distance between axes | The distance between axes (axes distance) A corresponds to the length of the joint plumb vector GLV. It describes the smallest distance between the rotation axes R1 and R2. |

According to the invention, a so-called modified skiving method is concerned in which the skiving tool 100 is tilted toward the work piece 50 or 60. Firstly, as follows, the basics for the design of skiving processes with tilt (inclination) are described.

Basically, the relative movement between the skiving tool 100 and the work piece 50, 60, 70 during skiving corresponds to a helical gear, also called generation helical type gear transmission. The helical gear is a spatial transmission gear.

The basic design of the skiving process thus occurs, as in the design of transmission gears, at a so-called calculation point AP. The term basic design is understood herein to refer to the definition of the spatial arrangement and movement of the skiving tool 100 with respect to the work piece 50, 60, 70 (kinematics) as well as the definition of the geometrical Terms concerning the contact between the skiving tool and the work piece:

There are several terms, which are necessary for the description of the contact between the skiving tool and the work piece. These terms are described in Table 2 below.

TABLE 2

| | |
|---|---|
| rolling circles | The rolling circles of the work piece 50, 60, 70 and the skiving tool 100 contact each other in the calculation point AP, which is therefore also called contact point BP. The rolling circle W2 of the work piece 50, 60, 70 (also called work piece rolling circle) lies in a plane that is perpendicular to the rotation axis R2 of the work piece 50, 60, 70. The center of the rolling circle W2 lies on the rotation axis R2 of the work piece 50, 60, 70. The diameter of the rolling circle W2 of the work piece is $d_{w2}$. |

TABLE 2-continued

| | |
|---|---|
| | The rolling circle W1 of the skiving tool 100 (also called tool rolling circle) lies in a plane that is perpendicular to the rotation axis R1 of the skiving tool. The center of the rolling circle W1 lies on the rotation axis R1 of the skiving tool 100. The diameter of the rolling circle W1 of the tool is $d_{w1}$. The diameter $d_{w1}$ of the rolling circle of the work piece 50, 60, 70 carries a sign. For outer toothings it is positive, for inner toothings it is negative. |
| reference planes | The reference plane of the work piece is the plane, in which the rolling circle W2 of the work piece lies. The reference plane of the tool is the plane, in which the rolling circle W1 of the tool lies. |
| chip half space, cutter half space | The reference plane of the tool divides the three dimensional space into halves. The chip half space shall be the half, into which the perpendicular to the cutting face, which points outwardly of the cutting edge material of the skiving tool 100, points into. The other half shall be called cutter half space. The cutting edges of the skiving tool 100 thus extend essentially in the cutter half space, however they can also extend into the chip half space, wherein the cutting faces are turned toward the chip half space. |
| velocity vectors | In the calculation point AP, the velocity vector $\vec{v}_2$ of the corresponding point of the work piece can be indicated, which vector results from the rotation of the work piece about R2. It lies in the reference plane of the work piece, tangentially to the rolling circle W2 of the work piece. The absolute value is $v_2 = |\pi \cdot d_{w2} \cdot n_2|$ with a rotation frequency $n_2$ of the work piece carrying a sign. In the calculation point, also the velocity vector $\vec{v}_1$ of the related point of the tool can be indicated, which vector results from the rotation of the tool about R1. It lies in the reference plane of the tool, tangentially to the rolling circle W1 of the tool. The absolute value is $v_1 = |\pi \cdot d_{w1} \cdot n_1|$ with the rotational frequency $n_1$ of the tool carrying a sign. |
| contact radius vectors | Starting from the calculation point AP, the plumb onto the rotation axis R2 of the work piece 50, 60, 70 can be drawn. The related orthogonal projection LF2 of the plumb corresponds to the intersection point between the reference plane of the work piece and the rotation axis R2 of the work piece (see e.g., FIG. 14B). The contact radius vector $\vec{r}_2$ of the work piece 50, 60, 70 is, for inner toothings, the vector from the orthogonal projection of the plumb LF2 to the calculation point AP, and for outer toothings the vector from the calculation point AP to the orthogonal projection of the plumb LF2. Its length is $|d_{w2}|/2$. Starting from the calculation point AP, the plumb onto the rotation axis R1 of the skiving tool 100 can be drawn. The related orthogonal projection of the plumb LF1 corresponds to the intersection point between the reference plane of the tool and the rotation axis R1 of the tool (see e.g., FIG. 14B). The vector from the orthogonal projection of the plumb LF1 to the calculation point AP is called contact radius vector $\vec{r}_1$ of the tool 100. Its length is $d_{w1}/2$. |
| contact plane BE | The two velocity vectors $\vec{v}_2$ and $\vec{v}_1$ span the so-called contact plane BE (see e.g., FIG. 12). The rolling circles W2 and W1 of the work piece 50, 60, 70 and the skiving tool 100 contact each other in this contact plane BE, and namely in the calculation point AP. In addition, also the theoretical pitch surface of the toothing of the work piece 50, 60, 70 and the rolling circle W1 of the skiving tool 100 contact each other in this contact plane BE according to the design. More exactly, the contact plane BE is tangentially to the mentioned pitch surface of the toothing of the work piece 50, 60, 70 and namely in the calculation point AP. |
| pitch surface, reference pitch surface | The pitch surface of a toothing is also called reference pitch surface. It goes through the calculation point AP, is rotationally symmetrical with respect to the rotation axis R2 of the work piece 50, 60, 70 and reflects a portion of the basic geometry of the toothing. The pitch circle (respectively rolling circle) W2 is part of the pitch surface of the toothing of the work piece 50, 60, 70. For the cylindrical toothings which are described here in detail and are shown in the drawings, the pitch surface is a cylinder, for conical toothings a cone, for planar toothings a plane and for general spatial toothings as, e.g., for hypoid wheels a hyperboloid. The explanations, which are given in the following in relation with cylindrical toothings, can be transferred accordingly to other toothings. |
| contact plane normal | The contact plane normal $\vec{n}$ shall be the normal vector of the contact plane BE which is anchored in the calculation point AP and which points into the toothing of the work piece 50, 60, 70, i.e., from the head section to the base section of the toothing. For outer toothings on the work piece 50, 60, 70, the contact plane normal $\vec{n}$ thus points toward the rotation axis R2 of the work piece 50, 60, 70, while it points away therefrom for inner toothings. For cylindrical toothings, the contact plane normal points in the same direction as the contact radius vector $\vec{r}_2$ of the work piece 50, 60, 70, i.e., n und $\vec{r}_2$ differ from each other only by their length (thus in FIG. 14B the contact radius vector $\vec{r}_2$ of the work piece 50 and the contact plane normal n are shown). |
| projection of contact plane | The view of the work piece 50, 60, 70 and the skiving tool 100 in the direction of the contact radius vector $\vec{r}_2$ of the work piece 50, 60, 70 is called projection of contact plane. The projected rotation axes R1 and R2 intersect in the projection of contact plane in the calculation point AP with respect to the contact point BP. |
| effective intersection angel of axes | The effective intersection angle of axes $\Sigma_{eff}$ is the angle embraced by the two velocity vectors $\vec{v}_2$ und $\vec{v}_1$ according to $$\cos(\textstyle\sum_{eff}) = \frac{\vec{v}_2 \cdot \vec{v}_1}{|\vec{v}_2||\vec{v}_1|}.$$ According to the invention the holds: $-90° < \Sigma_{eff} < 90°$, wherein $\Sigma_{eff} \neq 0°$. The effective intersection angle of axes $\Sigma_{eff}$ carries a sign as the intersection angle of axes $\Sigma$. The sign is defined as follows without restriction of the generality: For outer toothings, the effective intersection angle of axes $\Sigma_{eff}$ is positive, if the velocity vectors $\vec{v}_1$ and $\vec{v}_2$ and the contact plane normal $\vec{n}$ in this succession form a right-handed trihedron. For inner toothings, it is positive, if the velocity vectors $\vec{v}_1$ and $\vec{v}_2$ and the contact plane normal $\vec{n}$ in this succession form a left-handed trihedron. For non-planar toothings, the effective intersection angle of axes $\Sigma_{eff}$ corresponds to the perpendicular projection of the intersection angle of axes $\Sigma$ onto the contact plane BE, i.e., the intersection angle of axes $\Sigma$ in the projection of contact plane. |
| tilt angle | The tilt angle $\delta$ describes the tilt (inclination) of the tool reference plane and thus the skiving tool 100 with respect to the contact plane BE. It is the angle, which is in encompassed by the contact radius vector $\vec{r}_1$ of the skiving tool 100 and the contact plane normal n according to $$\cos(\delta) = \frac{\vec{n} \cdot \vec{r}_1}{|\vec{n}||\vec{r}_1|},$$ wherein $-90° \leq \delta \leq 90°$ (see FIG. 14B). The tilt angle $\delta$ is identical to the intersection angle (the smaller one in terms of its absolute value) between the rotation axis R1 of the skiving tool 100 and the contact |

TABLE 2-continued plane BE. The tilt angle δ is 0°, if the tool reference plane is
perpendicular to the contact plane BE and thus the rotation
axis R1 of the tool runs parallel to the contact plane BE.
The tilt angle δ carries a sign. The tilt angle δ is positive, if
the rotation axis R1 of the skiving tool 100 intersects the
contact plane BE in the chip half space. The tilt angle δ is
negative, if the rotation axis R1 of the skiving tool 100
intersects the contact plane BE in the cutter half space.

Further Projections:

There are different further projections, which are employed for illustrating the invention. The further projections are explained in Table 3 below.

TABLE 3

| | |
|---|---|
| side projection of intersection of axes | The vector of the side projection of intersection of axes shall be the velocity vector, which is perpendicular to the joint plumb GL and to the rotation axis R2 of the work piece 50, 60, 70, and which embraces an acute angle with the velocity vector $\vec{v}_2$ of the contacting point of the work piece. Then, the view of the work piece 50, 60, 70 and of the skiving tool 100 in the direction of this vector of the side projection of intersection of axes is called side projection of intersection of axes. In the side projection of intersection of axes, the projected rotation axes R1 and R2 run parallel to each other. |
| side projection of contact plane | The view of the work piece 50, 60, 70 and of the skiving tool 100 in the direction of the velocity vector $\vec{v}_2$ of the contacting point of the work piece is called side projection of contact plane. |

Offset of Cutting Face:

The offset of the cutting face is defined in Table 4 below.

TABLE 4

| | |
|---|---|
| offset of cutting face (only applicable for work pieces 50, 60, 70 having cylindrical toothings) | The offset of the cutting face (cutting face offset) e corresponds to the distance of the orthogonal projection (dropped perpendicular foot) LF1 and GLF1 along the rotation axis R1 of the skiving tool 100. It carries a sign. For inner toothings, the cutting face offset e has the same sign as the tilt angle δ. For outer toothings, the cutting face offset e has the opposite sign of the tilt angle δ. |

For non-planar toothings, the following equation [1] establishes the relationship between the angles, which describe the spatial arrangement of the rotation axes R1 and R2, and is thus important for the conversion of the individual quantities:

$$\cos(\Sigma)=\cos(\Sigma_{\mathit{eff}})\cdot\cos(\delta) \quad [1]$$

In this generalized configuration, the intersection angle of axes Σ is decomposed into the effective intersection angle of axes $\Sigma_{\mathit{eff}}$ and the tilt angle δ, wherein the effective intersection angle of axes $\Sigma_{\mathit{eff}}$ is the determining quantity for the generation of the relative cutting movement between the rotating skiving tool 100 and the rotating work piece 50, 60, 70. For planar toothings, the effective intersection angle of axes $\Sigma_{\mathit{eff}}$ and the tilt angle δ are well defined, however, the relationship [1] does not hold.

According to the invention, the tilt angle δ is always less than 0 degrees, i.e., the tilt of the tool reference plane and thus of the skiving tool 100 with respect to the contact plane (which is spanned by the two velocity vectors $\vec{v}_2$ and $\vec{v}_1$) is negative. Therefore, in relation with the present invention, a tilt of the skiving tool 100 toward the work piece 50, 60, 70 is concerned.

Figure 9A:
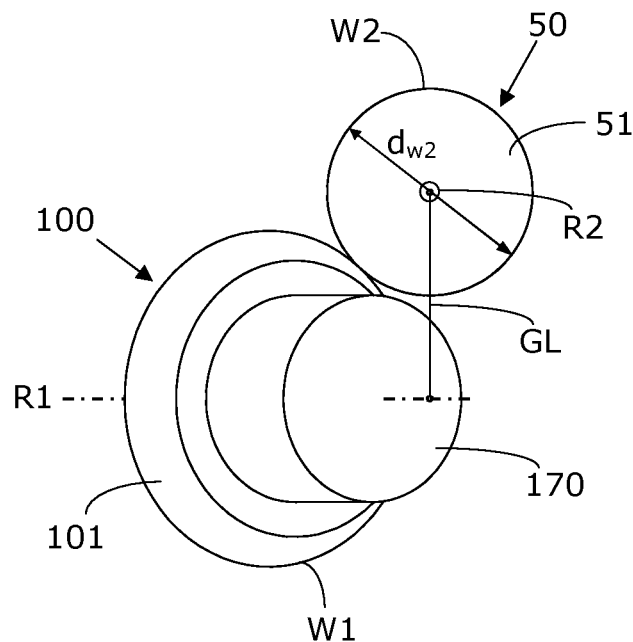
FIG. 9A shows a schematic view of a conical skiving tool during the modified skiving of a cylindrical work piece having an outer toothing, wherein the skiving tool is tilted toward the work piece.
Figure 9B:
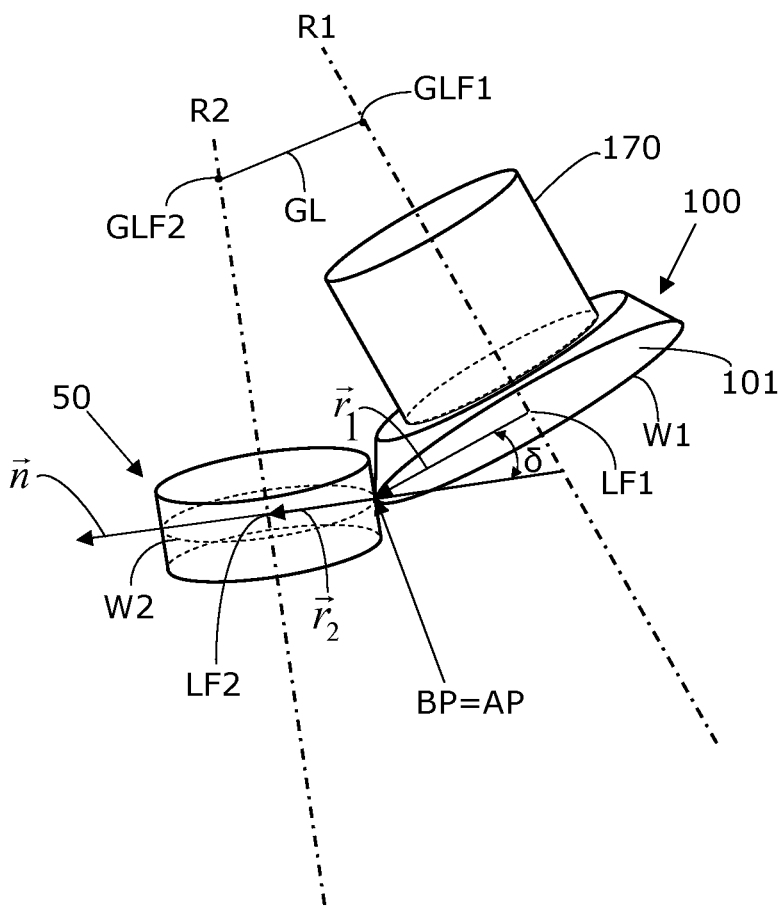
FIG. 9B shows a further schematic view of the conical skiving tool and work piece of FIG. 9A.

The calculation point AP with respect to the contact point BP, for a negative tilt angle δ, does not lie on the joint plumb GL as can be seen, e.g., in FIG. 9B. For outer toothings, the joint plumb GL lies in the cutter half space, and for inner toothings in the chip half space. The contact plane BE is perpendicular to the work piece reference plane, but not to the tool reference plane. The rotation axis R2 of the work piece 50, 60, 70 is parallel to the contact plane BE. However, the rotation axis R1 of the skiving tool 100 intersects the contact plane BE in the cutter half space. For a work piece 50, 60, 70 with cylindrical toothing, the contact radius vectors $\vec{r}_1$ and $\vec{r}_2$ embrace the tilt angle δ, as can be seen, e.g., in FIG. 9B. It can be stated more generally that the tilt angle δ is the very angle, which is embraced by the contact radius vector $\vec{r}_1$ of the skiving tool 100 and the contact plane normal $\vec{n}$.

Preferably, in all embodiments, the effective intersection angle of axes $\Sigma_{\mathit{eff}}$ is in the following range: $-60°\leq\Sigma_{\mathit{eff}}\leq 60°$.

According to the invention, the cutting face offset e is negative for inner toothings and positive for outer toothings. According to the invention, the clearance angles must be provided constructionaly on the skiving tool 100. Thereby, the loss of the clearing angle caused by the tilting of the cutting edges of the tool to the cylindrical component (i.e., to the work piece 50, 60, 70) must be compensated.

Figure 9C:
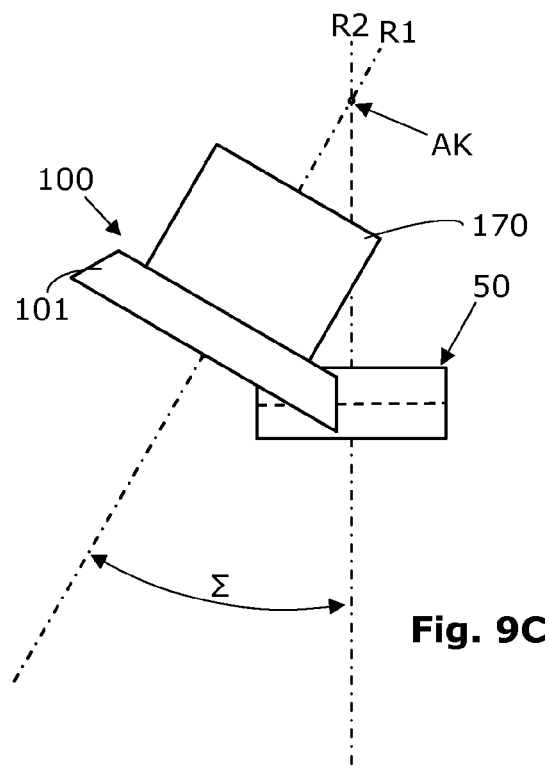
FIG. 9C shows a schematic projection of intersection of axes of the conical skiving tool and work piece of FIG. 9A.
Figure 9D:
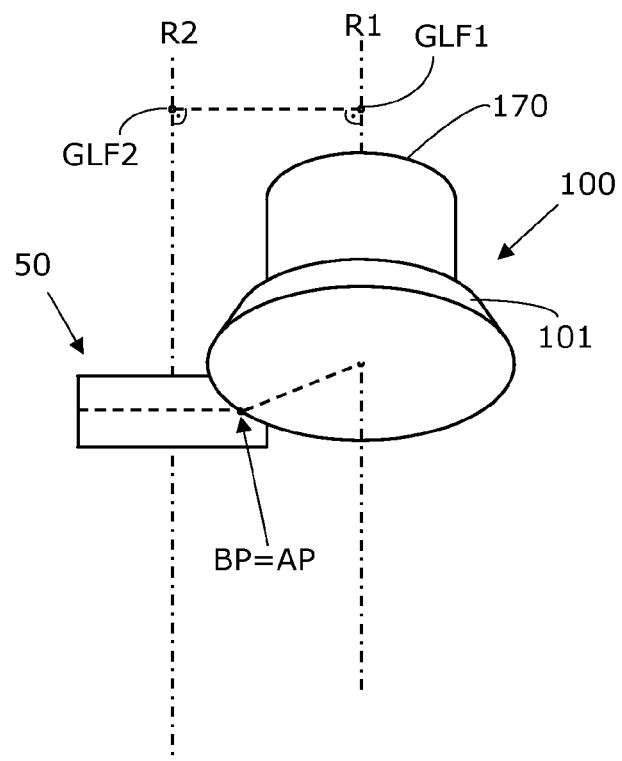
FIG. 9D shows a schematic side projection of intersection of axes of the conical skiving tool and work piece of FIG. 9A.
Figure 9E:
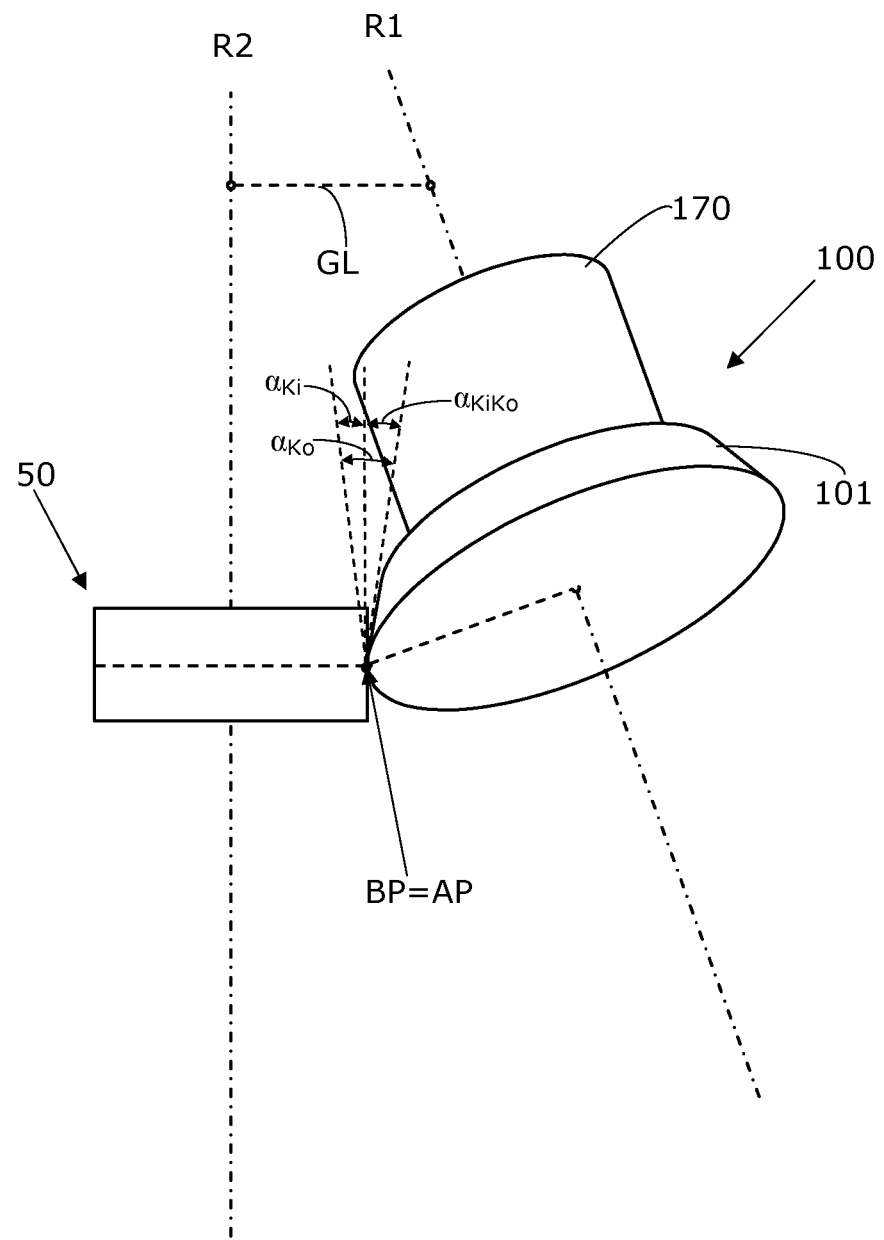
FIG. 9E shows a schematic side projection of contact plane of the conical skiving tool and work piece of FIG. 9A.

The side projection of contact plane in FIG. 9E shows the head rake angle $\alpha_{KiKo}$ achieved kinematically-constructionally as a sum of the kinematically generated negative rake angle $\alpha_{Ki}$ and the constructional tool rake angle $\alpha_{ko}$.

According to the invention, a so-called modified skiving method for skiving a work piece 50, 60, 70 is concerned, wherein a rotational-symmetric periodic structure, e.g., an outer or inner toothing, is to be fabricated on the work piece 50, 60, 70, with application of a skiving tool 100. As shown in the FIGS. 9A to 9E and on the basis of a further example in the FIGS. 10A to 10C (these FIGS. 9A to 10C are schematic drawings showing rolling (hobbing) bodies), the modified skiving method is characterized in particular in that the skiving tool 100 has a collision contour, which tapers to the rear such that collisions with the work piece 50, 60, 70 during the skiving are avoided. Preferably therefore, the skiving tool 100 has a cone-shaped, respectively conical or hyperbolic collision contour. During the skiving machining, the following steps are performed simultaneously and in coordination:

coupledly performing a relative movement of the skiving tool 100 with respect to the work piece 50, 60, 70, rotating the skiving tool 100 about a first rotation axis R1 and rotating the work piece 50, 60, 70 about a second rotation axis R2, wherein during the machining phase, a negative tilt angle δ is set, and the first rotation axis R1 runs skew (skew-whiff) with respect to the second rotation axis R2 such that the two rotation axis R1, R2 are aligned skewed relative to each other.

FIG. 9A shows a schematic view of a suitable skiving tool 100 having a collision contour that tapers to the rear side (here: conically) during the modified skiving of an outer-toothed cylindrical work piece 50. The skiving tool is tilted towards the work piece 50, i.e., the tilt angle δ is less than 0 degrees. FIG. 9A shows a top view of the cylindrical work piece 50. The front face 51 of the work piece 50 is in the plane of the drawing. Preferably, in all embodiments, the skiving tool 100 comprises skiving-wheel-type tool section 101, on which the cutting teeth are sitting. The skiving tool 100 is supported by a tool spindle 170, which is represented schematically in the Figures.

Figure 12A:
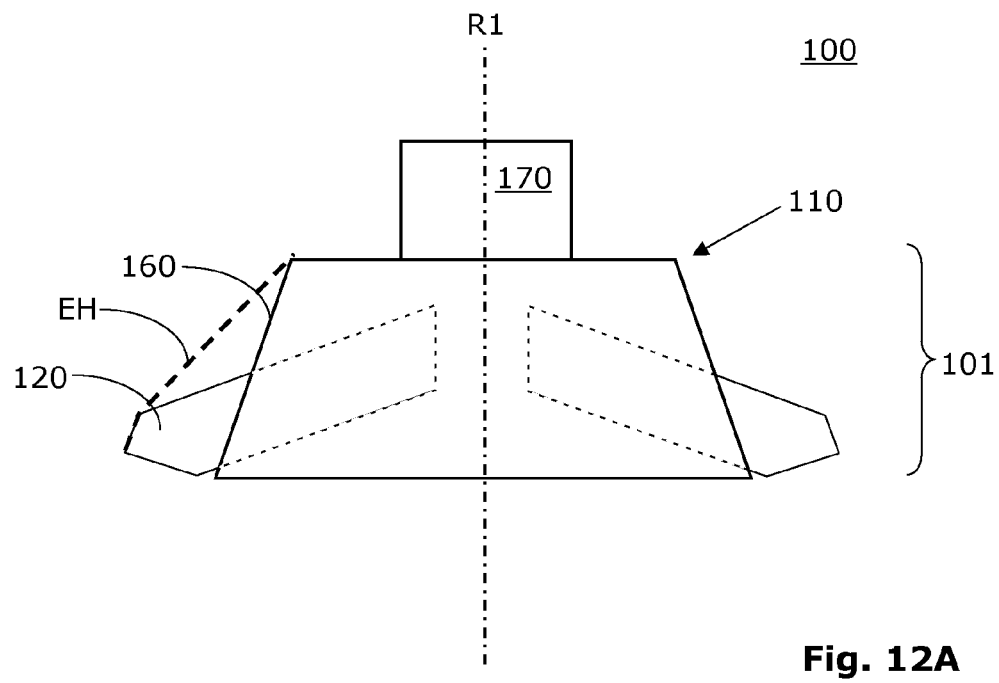
FIG. 12A shows a schematic view of a conically tapering skiving tool, which can be employed in relation with the invention for a tilt angle $\delta$ of −20 degrees.
Figure 12B:
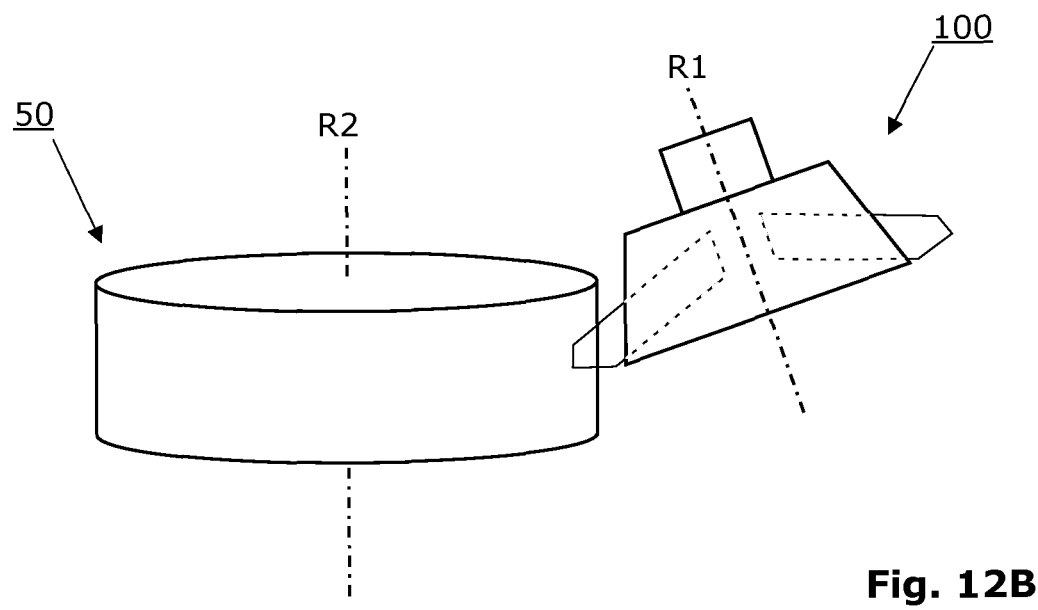
FIG. 12B shows a schematic view of the skiving tool of FIG. 12A together with a cylindrical work piece having an outer toothing, wherein an inclination angle $\delta$ of −20 degrees is prescribed.
Figure 13:
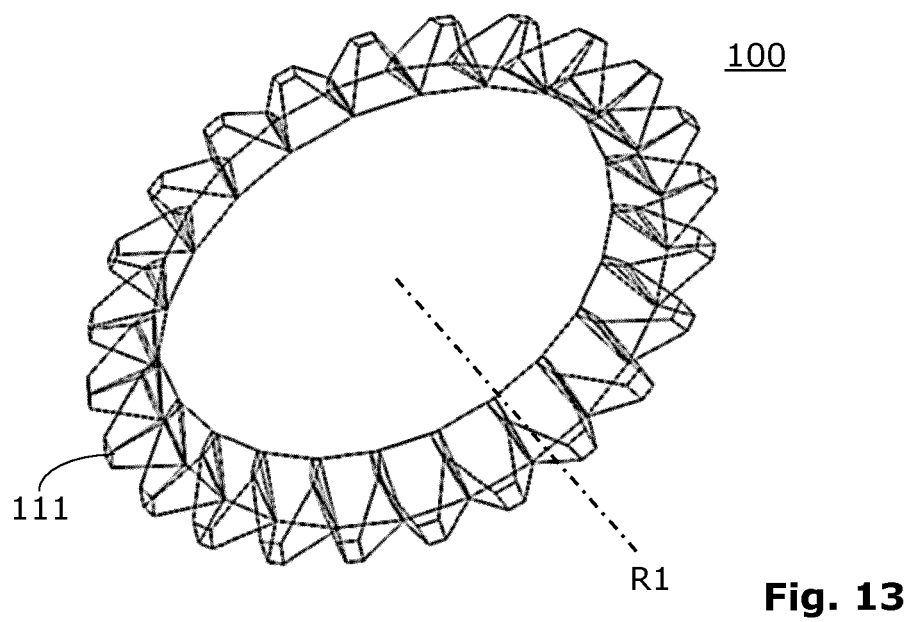
FIG. 13 shows a schematic view of a skiving tool in the form of a generating cutter-massive tool.

According to the invention, in all embodiments, the skiving-wheel-type tool section 101 has cutting edges, which are developed in the form of cutting teeth that project outwardly, as can be recognized, e.g., in the FIGS. 12A, 12B and 13. The cutting faces of the cutting teeth are developed substantially with respect to the front face of the tapering skiving-wheel-type tool section 101.

According to the invention, in all embodiments, the skiving-wheel-type tool section 101 has the shape of a generating cutter, preferably the shape of a bell-type generating cutter.

However, in all embodiments, an adapter element may sit between the skiving-wheel-type tool section 101 and the proper tool spindle 170.

FIG. 9B shows a further view of the embodiment of FIG. 9A. In FIG. 9B, the joint plumb GL and the contact point BP of the rolling circles W1, W2 of the skiving tool 100 and of the work piece 50 can be recognized. The contact point BP lies at the contact point of the rolling circle W1 of the skiving tool 100 having the radius vector $\vec{r}_1$ and the rolling circle W2 of the work piece 50 having the radius vector F.

FIG. 9C shows a projection of intersection of axes of the embodiment of FIG. 9A. The intersection angle of axes Σ can be recognized in FIG. 14C. The joint plumb GL is perpendicular to the plane of drawing of FIG. 14C and is thus reduced to the intersection point of axes AK.

FIG. 9D shows a side projection of intersection of axes of the embodiment of FIG. 9A. In FIG. 9D, the projections of the two axes R1, R2 are parallel in the plane of the drawing. The joint plumb GL is also in the plane of the drawing.

FIG. 9E shows a side projection of contact plane of the embodiment of FIG. 9A. The representation of FIG. 9E concerns a view, which shows the contact point BP of the rolling circles W1, W2 and the significant tilt of the tool towards the work piece.

In the embodiment example shown in the FIGS. 9A to 9E, the tilt angle δ amounts to −20 degrees.

Preferably, in all embodiments, the tilt angle δ is in a range between −2 and −45 degrees. An angle range between −5 and −30 degrees is particularly preferred.

The tapering collision contour of the skiving tool 100 is realized by a conical base body in the FIGS. 9A to 9E. The base body of the skiving tool 100 may, however, have another tapering-narrowing shape so as to avoid collisions. The cone angle of the conical base body of the skiving tool 100 amounts to exemplifying 30 degrees here. The cone angle may also take other values as long as a positive effective head rake angle in the region of the cutting edges of the skiving tool 100 is ensured by taking into account the tilt angle δ and other prerequisites.

In all embodiments, a tapering collision contour is understood to mean a tapering contour of the envelope EH of the skiving tool together with the cutting teeth. In FIG. 12A, the collision contour of the envelope EH of a skiving tool 100 is indicated by dotted line. On the basis of the dotted line, it can be recognized that the collision contour tapers to the rear.

Figure 8A:
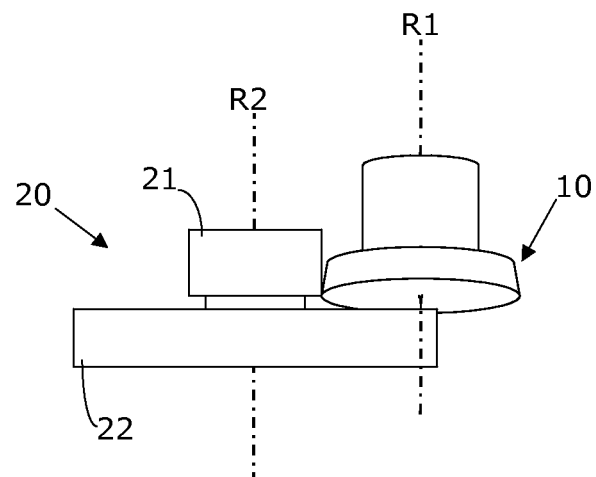
FIG. 8A shows a schematic side projection of intersection of axes (side projection of contact plane) of a conical skiving tool in the skiving of a work piece having an outer toothing with a small overrun, wherein an effective intersection angle of axes $\Sigma_{eff}$ of 18 degrees is predetermined and a collision between the skiving tool and the work piece results.
Figure 8B:
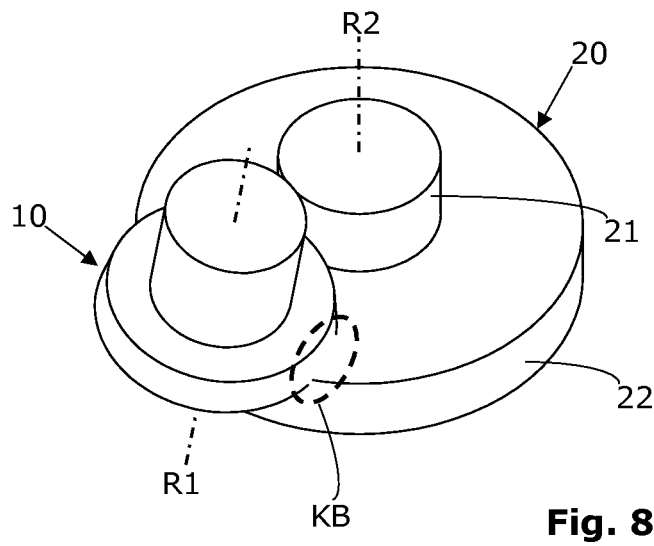
FIG. 8B shows a schematic view of the conical skiving tool and work piece of FIG. 9A in order to illustrate the collision more clearly.
Figure 10A:
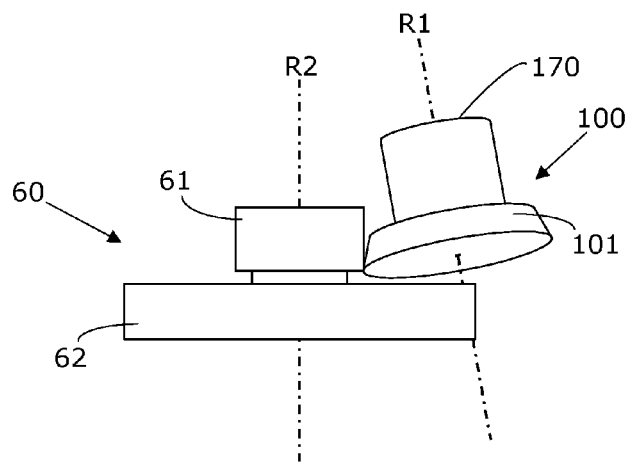
FIG. 10A shows a schematic view of a conical skiving tool during the modified skiving of a cylindrical work piece having an outer toothing with a small overrun, wherein the skiving tool is tilted toward the work piece.

FIG. 10A is a schematic side projection of contact plane of a further suitable conical skiving tool 100 during the modified skiving of another outer-toothed cylindrical work piece 60. The skiving tool 100 is tilted towards the work piece 60. In FIG. 10A, it can be recognized that the work piece 60 comprises a first cylindrical section 61 and a second cylindrical section 62, wherein both sections 61, 62 lie concentrically to the rotation axis R2 of the work piece 60. The same work piece is concerned here as shown in the FIGS. 8A and 8B.

Since periodical structures are to be manufactured on the first cylindrical section 61 and the allowable overrun is only small due to the neighboring section 62, the skiving tool 100 is inclined towards the work piece 60. The tilt angle δ amounts to −10 degrees here.

Figure 10B:
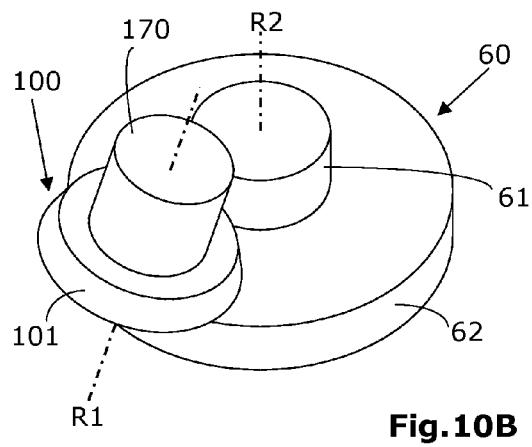
FIG. 10B shows a further schematic view of the conical skiving tool and work piece of FIG. 10A.
Figure 10C:
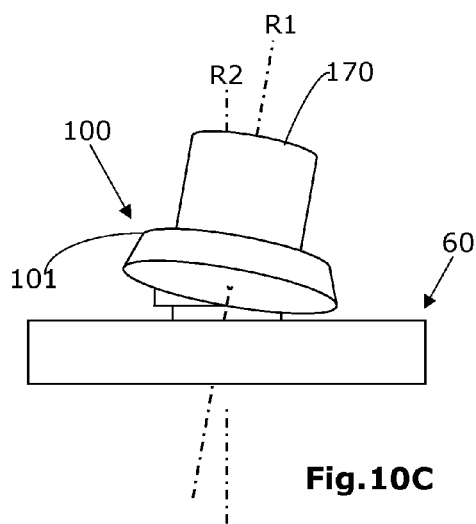
FIG. 10C shows a further schematic view of the conical skiving tool and work piece of FIG. 10A.

FIG. 10B and FIG. 10C show further views of the embodiment of FIG. 10A.

Figure 11:
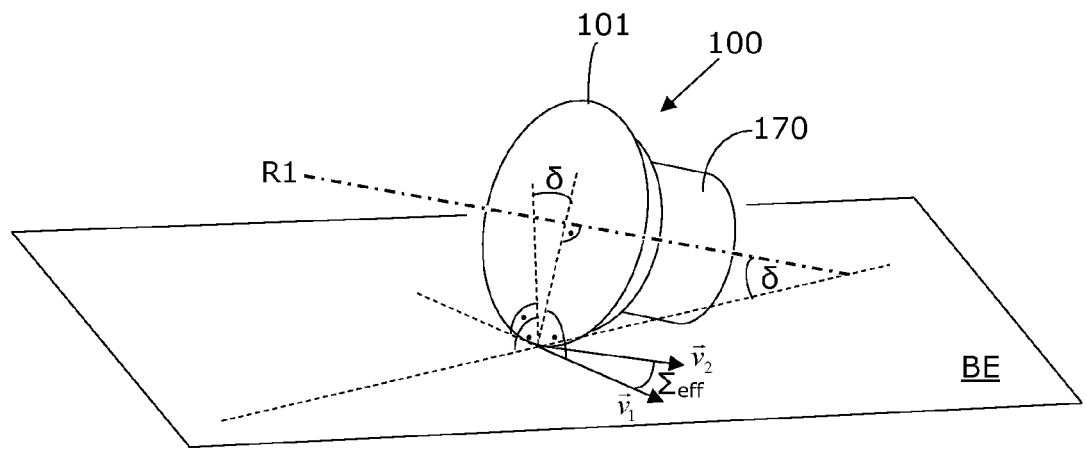
FIG. 11 shows a schematic view of a conical skiving tool with respect to the so-called contact plane.

FIG. 11 shows a schematic view of a conical skiving tool 100 with respect to the so-called contact plane BE. The representation of the inclination with respect to the contact plane BE according to FIG. 11 is particularly illustrative. The position of the tilt angle δ can be clarified well on the basis of FIG. 11.

Preferably, in all embodiments, the skiving tool 100 has a mantle shape or a base shape having a collision contour that tapers to the rear. To this end, the mantle shape or base shape may be composed, e.g., of a cylindrical portion and truncated-cone-shaped (conical) portion. Preferably, at least the skiving-wheel-type portions 101 of the skiving tool 100 has a tapering collision contour, as shown in the FIGS. 9A to 10C, 11, 12A, 12B and 13.

FIG. 12A shows a schematic view of a skiving tool 100 tapering conically, which can be employed in relation with the invention for a tilt angle δ of −20 degrees. As shown in the schematic representation of FIG. 18A, the skiving tool 100 concerns a so-called cutter head tool, which has a cutter head base body 110 (here comprising a truncated cone-shaped (conical) portion 160), which is equipped with cutter inserts, preferably in the form of bar cutters 120. The skiving tool 100 is fixed movement-specifically to a machine 200 by means of a tool spindle 170.

FIG. 12B shows a schematic view of the skiving tool 100 of FIG. 12A together with a cylindrical work piece 50, whereby a tilt angle δ of −20 degrees is predetermined. The skiving tool 100 has a collision contour that is chosen such that no collision of the skiving tool 100 with the work piece 50 results despite the inclination towards with δ=−20 degrees.

However, the skiving tool 100 may have any other shape, as shown by way of indication, e.g., in FIG. 13. FIG. 13 shows a skiving tool that has the shape of a generating cutter. Here, a massive tool is concerned, in which the cutting teeth 110 are part of the skiving tool 100. Here, the skiving tool comprises 24 cutting teeth 111, one of which is provided with a reference numeral in FIG. 13. The base body of the skiving tool 100 has the shape of a truncated cone disc or a truncated cone-shaped plate.

Figure 14:
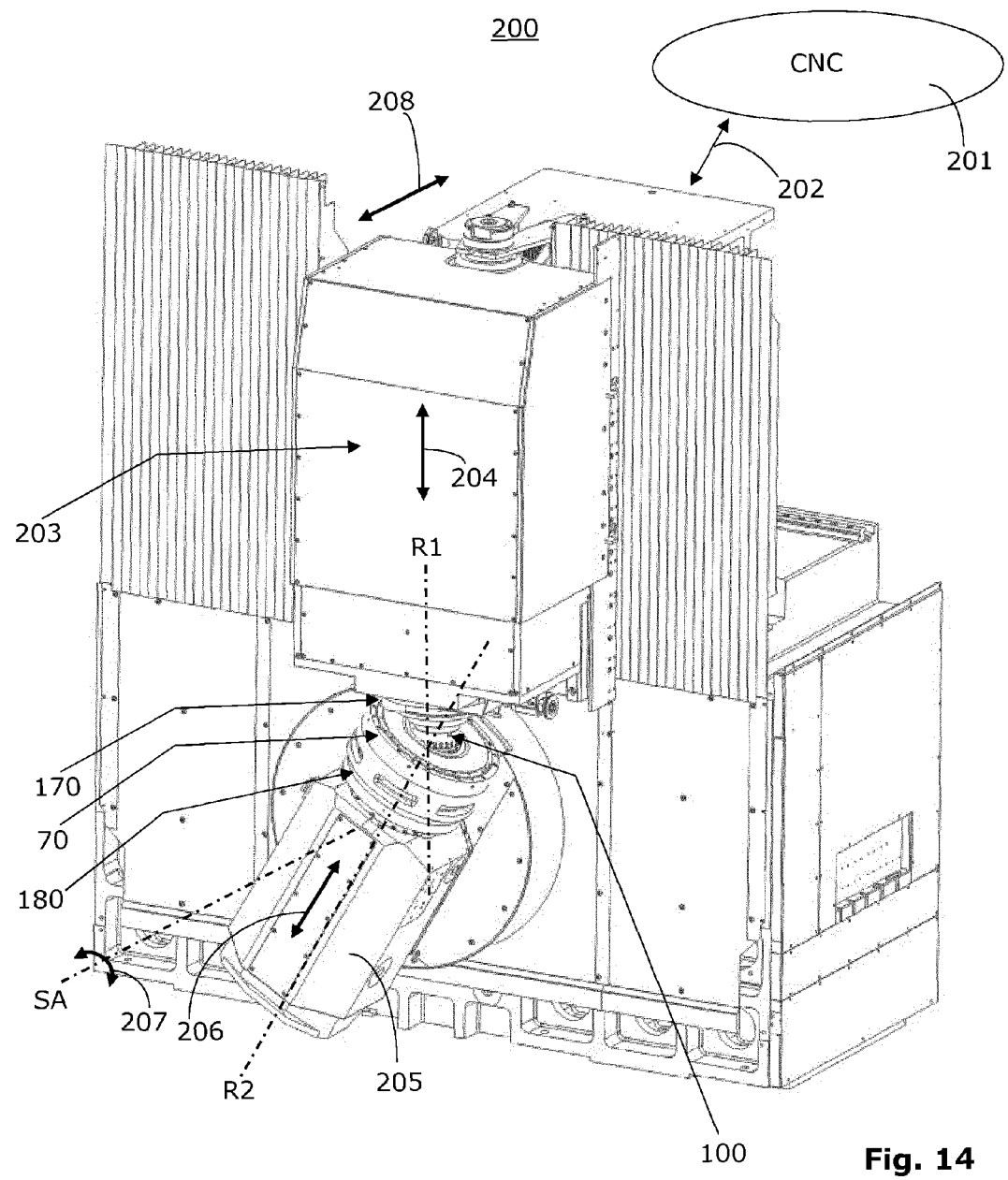
FIG. 14 shows a perspective view of a machine according to the invention comprising a skiving tool during the skiving of a work piece having an inner toothing.

A machine 200, which is designed for skiving according to the invention, comprises a CNC control 201, which enables a coupling of the axes R1 and R2, respectively a coordination of the movements of the axes. The CNC control 201 may be a part of the machine 200, or it may be implemented externally and suitable for a communication-specific connection 202 with the machine 200. The corresponding machine 200 comprises a so-called "electronic gear train", respectively "electronic or control-specific coupling of axes" in order to perform a relative movement of the skiving tool 100 with respect to the inner-toothed power skived work piece 70. The coupledly moving of the skiving tool 100 and the work piece 70 is performed such that during the machining phase, a relative movement between the skiving tool 100 and the work piece 70 results, which corresponds to a relative movement of a helical gear. The electronic gear train, respectively the electronic or control-specific coupling of axes enables a synchronization in terms of the rotational frequency of at least two axes of the machine 200. Herein, at least the rotation axis R1 of the tool spindle 170 is coupled with the rotation axis R2 of the work piece spindle 180. In addition, preferably in all embodiments, the rotation axis R2 of the work piece spindle is coupled with the axial feed 203 in the direction R1. The movement of the axial feed 203 is represented in FIG. 14 by a double arrow 204. In addition, the work piece spindle can be shifted linearly by means of a cartridge 205 parallel to the rotation axis R2, as represented by a double arrow 206. In addition, the cartridge 205 together with the work piece spindle 180 and the work piece 70 can be rotated about a pivot axis SA, as indicated by a double arrow 207.

Preferably, a machine 200 comes to application, which is based on a vertical arrangement, as shown in FIG. 14. In such a vertical arrangement, either the skiving tool 100 together with the tool spindle sits above the work piece 50, 60, 70 together with the work piece spindle 180, or vice versa. The chips, which are generated during the skiving, fall downward due to the action of gravity and may be removed, e.g., via a chip bed which is not shown.

In addition, a machine 200 which is designed for the modified skiving according to the invention, cares for the correct complex geometrical and kinematical machine settings and axes movements of the axes mentioned above. Preferably, in all embodiments, the machine has six axles. Five of these axles were already described. As a sixth axle, an axle may be conceived, which enables a linear relative movement of the work piece 50, 60, 70 with respect to the skiving tool 100. This linear relative movement is indicated in FIG. 23 by the double arrow 208.

The modified skiving method can be applied dry or wet in all embodiments, wherein the dry skiving is preferred.

In all embodiments, the work piece 50, 60, 70 may be pre-toothed or untoothed. For an untoothed work piece, the skiving tool 100 works into the massive material.

In all embodiments, the work piece 50, 60, 70 may be post-machined, preferably through application of a planishing method.

The modified skiving described and claimed herein offers a high productivity and flexibility.

The application spectrum of the modified skiving is large and extends to the manufacturing of rotational-symmetric periodic structures.

The modified skiving described herein enables high rates of material removal. At the same time, it enables to achieve favorable surface structures on tooth flanks and other machined surfaces.

In the modified skiving, material is progressively removed from the work piece 50, 60, 70 until the teeth, respectively the tooth gaps or other periodic structures, are formed completely.

The modified skiving concerns a high performance method that has significant potentials in the machining time. In addition to the low cycle times, the tool costs are relatively low. All these aspects contribute to the particular cost effectiveness of the modified skiving.

The invention claimed is:

1. A method for skiving a work piece having a rotationally-symmetric, periodic structure, comprising applying a skiving method to the work piece, the method further comprising:
   coupledly performing a relative movement of a skiving tool, which comprises a body and cutting teeth that together define a tapering collision contour, in relation to the work piece;
   rotating the skiving tool about a first rotation axis;
   rotating the work piece about a second rotation axis that runs, during the application of the skiving method, skew relative to the first rotation axis; and
   setting a negative tilt angle of the skiving tool during the skiving.

2. The method according to claim 1, wherein said relative movement during the application of the skiving method corresponds to a relative movement of a helical gear.

3. The method according to claim 1, wherein said tilt angle is between −2 degrees and −45 degrees.

4. The method according to claim 1, further comprising providing an effective intersection of the first and second rotation axes in the range of: $-60° \leq \Sigma_{\mathit{eff}} \leq 60°$.

5. The method according to claim 1, wherein the skiving tool comprises a plurality of cutting teeth, each having constructional rake angles.

6. The method according to claim 1, further comprising providing a kinematic-constructionally head rake angle from a sum of a kinematically generated negative rake angle and a constructional rake angle of the skiving tool.

7. The method according to claim 1, wherein the rotationally-symmetric, periodic structure includes (i) a toothing comprising interior teeth or (ii) a toothing comprising exterior teeth of the work piece.

8. The method according to claim 7, wherein the work piece is a cylindrical work piece defining a predefined cutting face offset, which is negative for said toothing comprising interior teeth and positive for said toothing comprising exterior teeth.

9. The method according to claim 1, wherein the work piece allows only a small overrun.

10. An apparatus for skiving a work piece having a rotationally-symmetric, periodic structure by applying a skiving tool, the apparatus comprising:
    a skiving tool having a tapering collision contour and comprising a body and cutting teeth that together define the tapering collision contour;
    a tool spindle configured to fix the skiving tool;
    a work piece spindle configured to fix the work piece; and
    numerically controlled drives configured to coupledly perform a relative movement and to coupledly rotate the skiving tool together with the tool spindle about a first rotation axis and the work piece together with the work piece spindle about a second rotation axis, wherein the apparatus includes a numerical control or is connectable with a numerical control configured to provide a tilt angle during the skiving, and the first rotation axis skew with respect to the second rotation axis.

11. The apparatus according to claim 10, wherein the skiving tool has a tool section, which has cutting edges defining cutting teeth which project outward.

12. The apparatus according to claim 10, wherein the skiving tool has a tool section defining one of a disc-type cutting wheel or a deep counterbore-type cutting wheel.

13. The apparatus according to claim 10, wherein said tilt angle is towards the work piece.

14. The apparatus according to claim 10, wherein the apparatus comprises a machine having six axes.

15. The apparatus according to claim 10, wherein the skiving tool is a massive tool or a bar cutter skiving wheel.

16. The apparatus according to claim 10, wherein the numerical control is configured to set said tilt angle at a negative tilt angle.

17. The apparatus according to claim 11, wherein the tool section defines a skiving wheel.

18. The apparatus according to claim 12, wherein the tool section defines a skiving wheel.

19. The apparatus according to claim 13, wherein the tilt angle is between −2 degrees and −45 degrees.

* * * * *